United States Patent [19]

Reinartz et al.

[11] Patent Number: 5,000,525
[45] Date of Patent: Mar. 19, 1991

[54] BRAKE SYSTEM

[75] Inventors: Hans-Deiter Reinartz, Frankfurt am Main; Peter Volz, Darmstadt, both of Fed. Rep. of Germany

[73] Assignee: Alfred Teves GmbH, Frankfurt am Main, Fed. Rep. of Germany

[21] Appl. No.: 424,266

[22] PCT Filed: Mar. 2, 1989

[86] PCT No.: PCT/EP89/00209
§ 371 Date: Oct. 23, 1989
§ 102(e) Date: Oct. 23, 1989

[87] PCT Pub. No.: WO89/08573
PCT Pub. Date: Sep. 21, 1989

[30] Foreign Application Priority Data

Mar. 8, 1988 [DE] Fed. Rep. of Germany ....... 3807452
Mar. 11, 1988 [DE] Fed. Rep. of Germany ....... 3808126

[51] Int. Cl.$^5$ .............................................. B60T 8/40
[52] U.S. Cl. ...................................... 303/116; 303/11
[58] Field of Search ...................... 303/10, 11, 94, 95, 303/100, 101, 114, 116

[56] References Cited

U.S. PATENT DOCUMENTS 4,826,255 5/1989 Volz ................................. 303/116 X
4,840,435 6/1989 Steffes ................................. 303/116

FOREIGN PATENT DOCUMENTS

0109480 6/1983 European Pat. Off. .
0255681 2/1988 European Pat. Off. .
2122757 11/1972 Fed. Rep. of Germany .
2425022 12/1975 Fed. Rep. of Germany .
2626371 12/1976 Fed. Rep. of Germany .
2933084 3/1981 Fed. Rep. of Germany .
3028396 2/1982 Fed. Rep. of Germany .
3241039 5/1984 Fed. Rep. of Germany .
3403237 8/1985 Fed. Rep. of Germany .
2192684 1/1988 United Kingdom .

Primary Examiner—Duane A. Reger
Attorney, Agent, or Firm—Robert P. Seitter; J. Gordon Lewis

[57] ABSTRACT

A brake system for automotive vehicles with a device for anti-lock control. A pump is provided which, in the control mode, delivers a reduced fluid volume for positioning a piston of the master cylinder. The reduction of the delivery volume is accomplished in that the non-return valve (64, 65) is kept open. Accordingly the movements of the piston (56) become ineffective with respect to the delivery of pressure fluid. The non-return valve (64, 65) is kept open by an electromagnetic actuating unit (62). This actuating unit is controlled by the electronic control unit of the anti-lock device. In this manner at least one piston of the master cylinder and thus the brake pedal are positioned during the control mode in a predefined manner.

18 Claims, 8 Drawing Sheets

BRAKE SYSTEM

BACKGROUND OF THE INVENTION

The present invention relates to a brake system for automotive vehicles, comprising a master cylinder, wheel cylinders and a device for anti-lock control. In the control mode for the positioning of at least one piston of the master cylinder in a desired position, a pump is provided, whose volume of delivery is variable, and which communicates by way of a hydraulic pressure line with the master cylinder and which positions the piston by the volume of fluid it delivers. The pump is part of a pump unit having at least one inlet line that provides a connection to the supply reservoir. An electronic control unit for the anti-lock control.

Anti-lock systems increasingly are used in the automotive vehicle industry. In certain applications of these anti-lock systems, hydraulic pumps are used for generating an auxiliary pressure in the control mode. Such anti-lock apparatus are known, for example, from German patent application P 37 31 603.6, corresponding to U.S. Pat. No. 4,826,255 which issued on May 2, 1989.

This patent application describes a brake system for automotive vehicles, comprising a master cylinder, wheel cylinders and a device for anti-lock control. For the positioning of the piston of the master cylinder in a desired position in the control mode, this brake system provides a pressure fluid source comprising a pump, whose volume of delivery is variable, which pump communicates by way of a hydraulic line with the master cylinder and which positions the piston by the volume of fluid it delivers.

In accordance with the objects of the present invention reliability and the desired pedal feeling are improved in such brake systems. More particularly, the "fail-safety" of the electric motor and thus of the pump driven by the electric motor as well as of the entire system are enhanced. Moreover, the brake pedal assumes a predefinable position in front of its initial position in the anti-lock control mode. It is desired that the electric motor continues its operation throughout the control mode. No repeated run-up should take place, thereby to avoid peaks in current. The relay stress is reduced, and the reliability of the entire system is increased.

The high starting currents of the electric motor for driving the pump will occur only once for each control action. The structural manufacturing effort and therefore expense is to be limited in order to obtain lower cost and in order to increase the reliability by relieving strain on the component parts. It is a further object to reduce the manufacturing cost of the overall brake system. The number of hydraulic lines, bores and valves is to be reduced.

In a brake system of dual-circuit design and including a tandem master cylinder, the following further object is to be achieved. In the event that only the push rod piston is sensed, then only the push rod piston is positioned by the pump volume of delivery, while the floating piston is slid back into its basic position, that is, the central-valve regulating position.

SUMMARY OF THE INVENTION

These and other objects are achieved according to the present invention in that the pump unit comprises means which reduce the pump output as a function of the position of the master cylinder working piston. These means are activated by one or more output signals of the electronic control unit. The means can be activated electromagnetically, hydraulically, mechanically or pneumatically, preferably by the difference between the atmospheric pressure and the vacuum at the intake manifold of the internal combustion engine of the vehicle. In brake systems having a suction or inlet valve in the inlet line of the pump unit, which valve is provided as a non-return valve, it can be provided that these means comprise a tappet device which lifts the closure member of the non-return valve from the valve seat.

As an alternative to this embodiment, it is furthermore provided that a tappet device is arranged which jams the closure member of the suction or inlet valve which is arranged as a non-return valve in its opened position and thereby permits passage of the pressure fluid. In another embodiment, the rate of delivery of the pump can be throttled by a shut-off mechanism, preferably comprising a closure member and a valve seat, inserted in the inlet line.

In another embodiment, that the pressure line is provided with a shut-off mechanism preferably comprising a displaceable blocking element which shuts off the pressure line to the master cylinder so that, upstream of the shut-off mechanism, the pressure line connects by way of a hydraulic return line with the inlet line, and a pressure-relief valve disposed in the return line. If the brake system is equipped with a pump having a lifting piston, a stroke-limiting device can be provided which comprises a slide element blocking the movements of the lifting piston. It may be arranged that the lifting piston abuts on the slide element when the slide element is actuated. More particularly, provision can be provided that the lifting piston includes a step which is seated on the end of the slide element. The means for reducing the pump output, in particular the shut-off mechanisms, can be inserted into any one or into both of the pump circuits or into one or both of the pumps, respectively. One circuit can be de-activated in the traction slip control mode.

The desired objects also can be achieved in that there is provided a device for blocking the suction side of the pump, wherein the device is arranged so as to remove blocking of the suction side when the working piston of the master cylinder has covered a predetermined distance into the master cylinder. Another embodiment of the present invention provides for the device for blocking the suction side of the pump to be a valve which is actuatable by way of a ramp-and-tappet arrangement.

It is further proposed that the device for blocking the suction side of the pump comprises a piston element provided with ramps, a tappet element, a valve seat, a closure member subjected to the pressure of a spring, wherein, upon movement of the piston element, the ramps of the piston element move the tappet and that the tappet lifts the closure member from the valve seat. The device for blocking the suction side of the pump can be arranged as an integral part of the master cylinder. Alternatively, the device for blocking the suction side of the pump can be accommodated in a housing mounted on the master cylinder which is preferably cast thereon.

In another embodiment of the present invention, it is proposed that the device for blocking the suction side of the pump comprises at least one working piston (push rod piston and/or floating piston) of the master cylinder that is provided with switching ramps, a tappet element, a valve seat, a closure member, wherein upon movement of the working piston the ramps of the working piston move the tappet element, and wherein the tappet element lifts the closure member from the valve seat.

BRIEF DESCRIPTION OF THE DRAWING

Further details of this invention can be gathered from the following description of an embodiment of this invention taken in conjunction with the accompanying drawing wherein.

DETAILED DESCRIPTION

Figure 1:
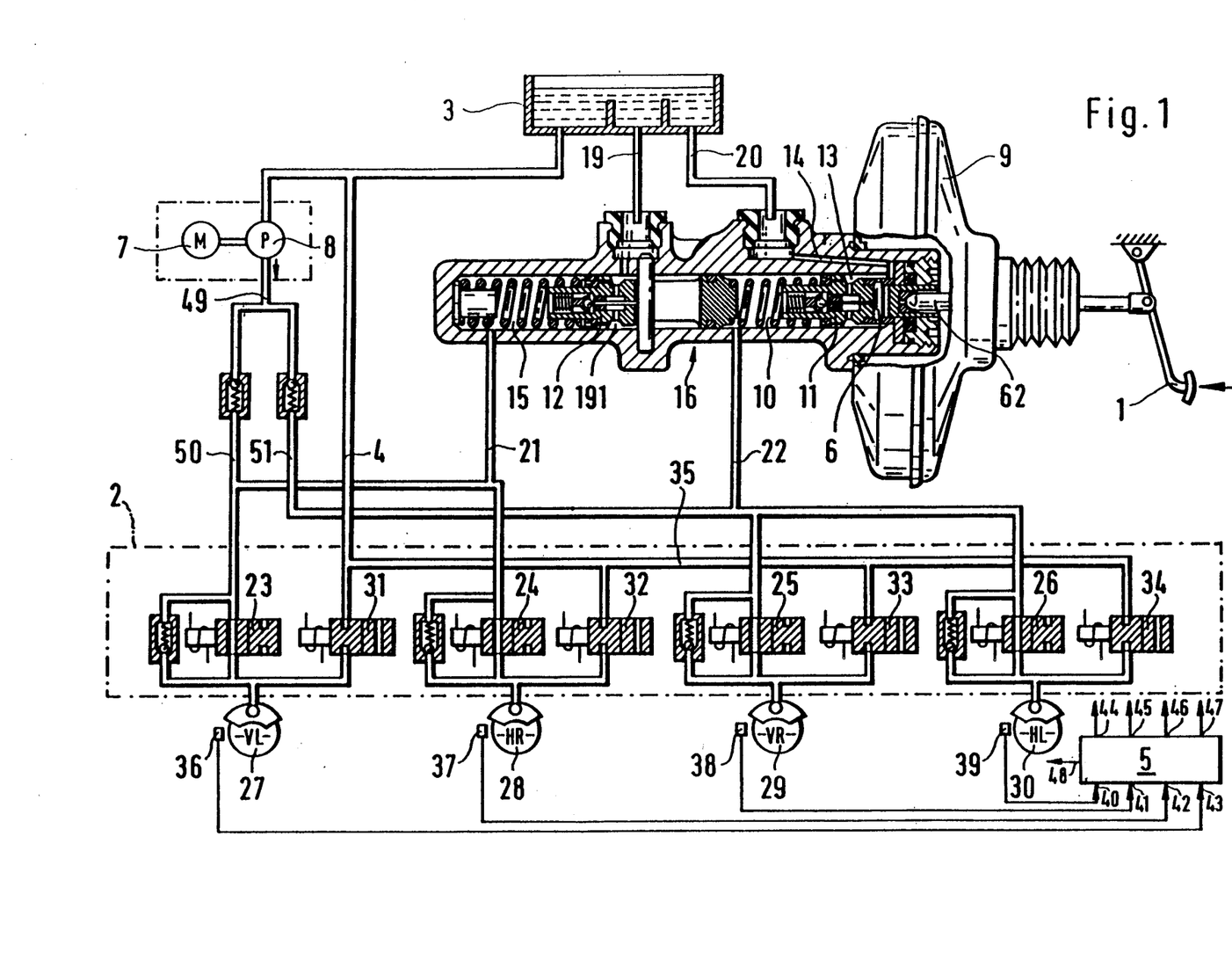
FIG. 1 shows an anti-lock device with a vacuum brake power booster.

The device according to FIG. 1 is known and comprises the following basic components: a vacuum brake power booster 9 actuated by the brake pedal 1, a tandem master cylinder 16, a modulator 2 for the pressure regulation in the anti-lock mode, an electronic control unit 5 for processing sensor signals and a hydraulic pressure pump 8 driven by an electric motor 7.

FIG. 1 illustrates the system in its release position. In a known fashion, the pressure chambers 10, 15 of the master cylinder communicate with the pressure-fluid supply reservoir 3 by way of open central regulating valves, by way of connecting channels in the interior of the pistons and by way of an annular chamber in the intermediate piston, by way of bores and by way of hydraulic lines 19, 20. The two pressure circuits 21, 22 of the master cylinder communicate with the wheel brakes 27, 28, 29, 30 by way of electromagnetically actuatable valves which are open in their initial position, that is to say so-termed SO-valves (SO = opened in their de-energized state) or inlet valves 23, 24, 25, 26.

The parallel connected wheel brakes 27, 28 and 29, 30, respectively, are allocated to the diagonally arranged pressure circuits (brake circuits) 21, 22.

For the arrangement of the vehicle wheels corresponding with the mentioned brakes, the following abbreviated terms are used: VL for left front side, HR for right rear side, VR for right front side, and HL for left rear side. The wheel brakes 27, 28, 29, 30 are connectable further to the supply reservoir or pressure-compensating reservoir 3 by way of electromagnetically actuatable outlet valves 31, 32, 33, 34, so-termed SG-valves (SG = closed in their de-energized state) which are closed in their inactive position, by way of a hydraulic return line 35 and by way of the line 4. The vehicle wheels are equipped with sensors 36, 37, 38, 39 which cooperate with toothed discs rotating synchronously with the wheel rotation and which generate electric signals indicative of the wheel rotational behavior, that is the wheel speed and variations thereof. These signals are fed by way of the inputs 40, 41, 42, 43 to the electronic control unit 5. This electronic control unit processes the sensor signals on the basis of a memorized control algorithm to form output signals (braking-pressure control signals) which serve to switch over the SO-valves and SG-valves in the braking pressure control mode, whereby the braking pressures in the individual wheel cylinders of the disc brakes are decreased, kept constant or re-increased according to the control algorithm. To this end, the actuating magnets of the SO-valves and SG-valves are driven by way of the outputs 44, 45, 46, 47 of the electronic control unit. For clarity, the electric connecting lines between the outlets 44, 45, 46, 47 and the coils of the SO-valves and SG-valves are not illustrated in the Figures. The electric motor 7 of the pump 8 is put into operation in the braking pressure control mode.

The switch-on signal is applied to the motor by the output 48 of the electronic control unit 5. In the control mode, the pump develops pressure in the pressure lines 49, 50, 51. These lines represent a pressure fluid conduit which is connected with the pressure fluid conduit of the tandem master cylinder, i.e., the pressure lines 21, 22. That is, in the control mode, the pressure chambers 10, 15 of the tandem master cylinder are pressurized by the pump.

Upon brake application in the normal braking mode, the pedal force F is transmitted onto the master cylinder pistons boosted by the vacuum in the booster 9. The central regulating valves in these pistons will close, thus allowing braking pressure to develop in the pressure chambers 10, 15 and hence in the brake circuits 21, 22 which propagates by way of the SO-valves 23, 24, 25, 26 to the wheel brake cylinders. On detection of an imminent locked condition at one or more of the wheels by means of the sensors 36, 37, 38, 39 and the electronic control unit 5, the anti-lock control mode will commence. The drive motor 7 of the pump 8 will be switched on, whereby pressure develops in the pressure lines 49, 50, 51 which, on the one hand, is applied on the wheel cylinders of the wheel brakes by way of the SO-valves and, on the other hand, pressurizes the pressure chambers of the master cylinder, as is illustrated. In response to the control algorithm, further signals of the electronic control unit will cause change-over of the electromagnetically actuatable SO-valves and SG-valves.

The pump pressure in the working chambers 10 and 15 causes the working pistons 11 and 12 in FIG. 1 to displace to the right. The push rod piston 11 moves up to its right-hand stop 6 (FIG. 1) in the known brake power boosters. As a result, the brake pedal 1 is reset, it assumes its initial position. That is, the driver's foot pushes against a reset pedal. In this position, the central valves of the push rod piston 11 and of the intermediate piston 12 will open. Pressure fluid flows back by way of these central valves into the supply reservoir 3 in a known manner by way of the return lines 19 and 20.

The intermediate piston is effected by way of the unpressurized annular chamber of the intermediate piston. The push rod piston is effected by way of the unpressurized supply chamber 13, and the supply bore 14 into the return line 20. During the entire control mode, the working pistons are retained in their initial position. Likewise the brake pedal is retained in its initial position during the entire control mode.

In this regard, German patent application P 37 31 603.6 shows a sensing of the push rod piston or of the sheet-metal piston of the vacuum brake power booster. Depending on the actual position of the working piston, this known pump delivers certain volumes into the working chamber of the master cylinder in order to cause the working piston to adopt its nominal position.

This also is intended to position the brake pedal, which is coupled to the working piston in terms of effect, in front of its normal initial position during the control mode.

Starting from and advancing this known idea, the instant invention teaches the art a pump unit comprising means which reduce the rate of delivery of the pump as a function of the position of the working piston of the master cylinder. These means are activated by one or more output signals of the electronic control unit. The inlet line of the pump unit is referred to and illustrated as numeral 17 in FIGS. 2 to 5. This inlet line connects the supply reservoir with the suction side of the pump. Numeral 18 refers to the hydraulic line leading to the master cylinder, and 52 refers to the hydraulic line leading to the wheel cylinder and to the pressure modulator, respectively. Reference numeral 53 stands for the pressure line serving to feed the hydraulic line to the master cylinder and the hydraulic line to the wheel cylinder. The drive shaft 54 and an eccentric 55 are depicted in FIGS. 2 to 5. The eccentric moves the radially disposed pistons 56, 57. As is discernible from the drawing, these pistons are lifting pistons which are moved by the external sleeve 58 of a roller bearing seated on the eccentric.

To describe the embodiments, the right-hand half of FIGS. 2 to 5 is used. On operation of the pump, pressure fluid flows by way of the inlet line 17 and the opened non-returned valve 59 into the working chamber 60 of the pump. When the pump is delivering, pressure fluid flows from there by way of the non-return valve 61, the pump line 53 into the line 18 to the master cylinder and into the line 52 to the wheel cylinders.

Figure 2:
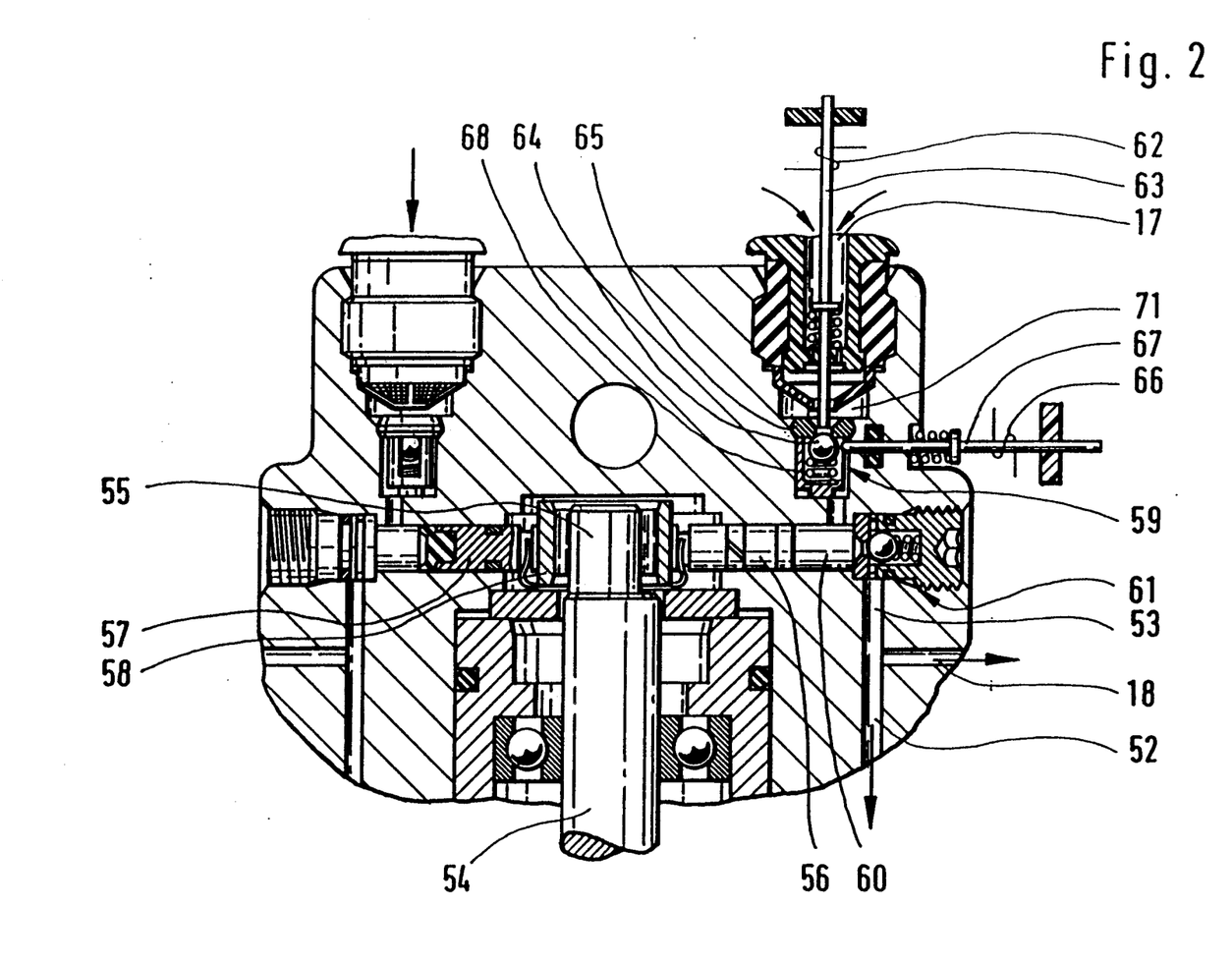
FIGS. 2 to 5 show in a cross-sectional view the portion of a pump unit with several embodiments.

The mode of operation of the embodiment according to FIG. 2 now will be described: As has been illustrated in and described with reference to FIG. 1, the pump is set to operate upon the commencement of the control mode. When during the control mode the volume of delivery of the pump is reduced for positioning the working piston of the master cylinder, the electromagnetic actuating unit 62 is activated by a signal of the electronic control unit of the anti-lock system. The tapped 63 lifts the ball 64 from the valve seat 65. Therefore, the pump produces no further output. Fluid volume is returned upon each piston strike by way of the opened non-return valve into the unpressurized suction channel 71.

Reference numeral 66 designates another electromagnetic actuating unit which can be employed as an alternative of the electromagnetic actuating unit 62. When the electromagnetic actuating unit 66 is activated, the ball 64 is pressed by way of the tappet 67 against the left wall of the element 68, an open gap being formed thereby on the right-hand side between the ball 64 and the valve seat 65. This open gap permits the above-described return flow of the pressure fluid into the unpressurized suction channel 71.

Figure 3:
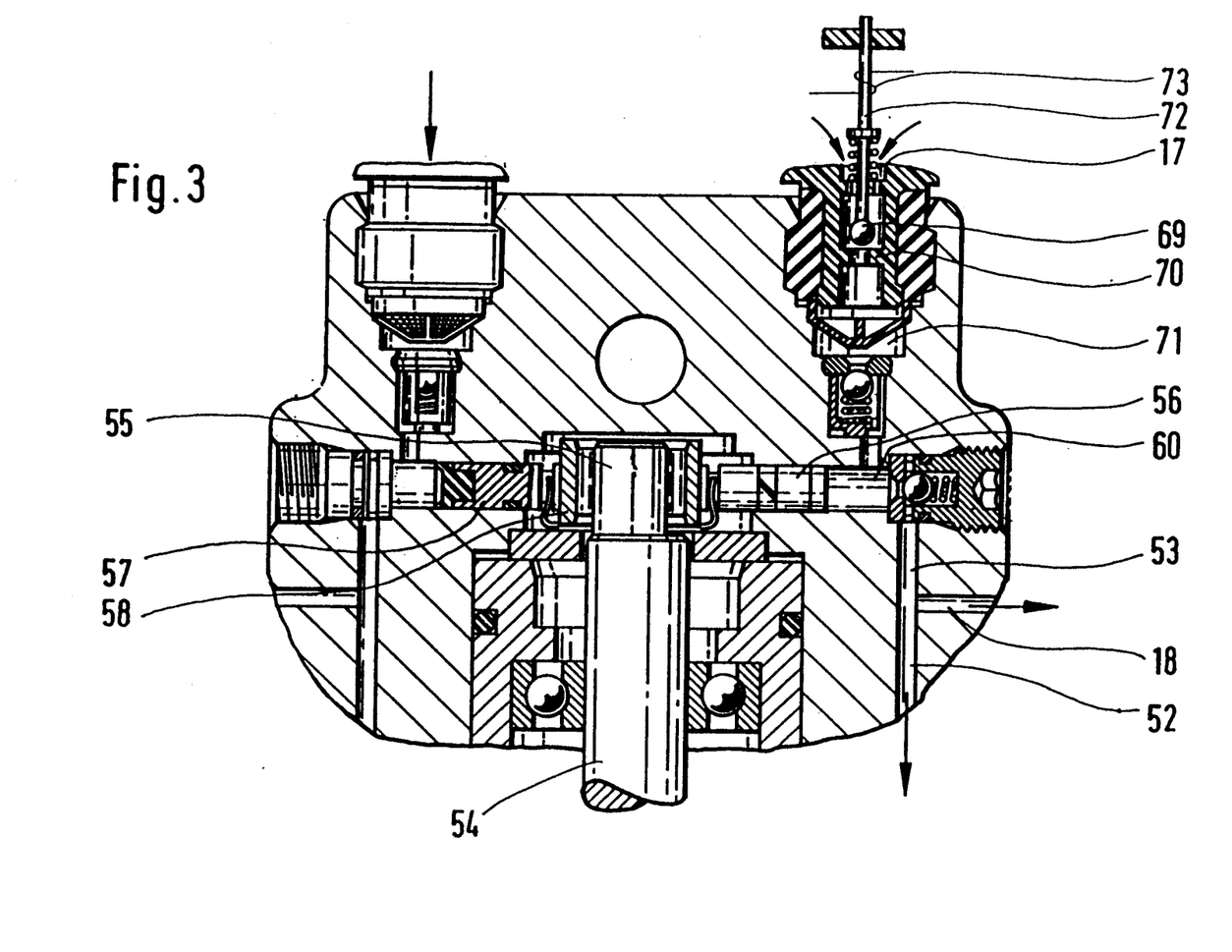

The embodiment illustrated in FIG. 3 provides a closure member 69 and a valve seat 70. Throttling of the pump output is achieved by blocking the suction channel 71. This blocking action is accomplished by the closure member 69 taking seat on the valve seat 70. The closure member is moved by way of the rod 72 by the electromagnetic actuating unit 73.

Figure 4:
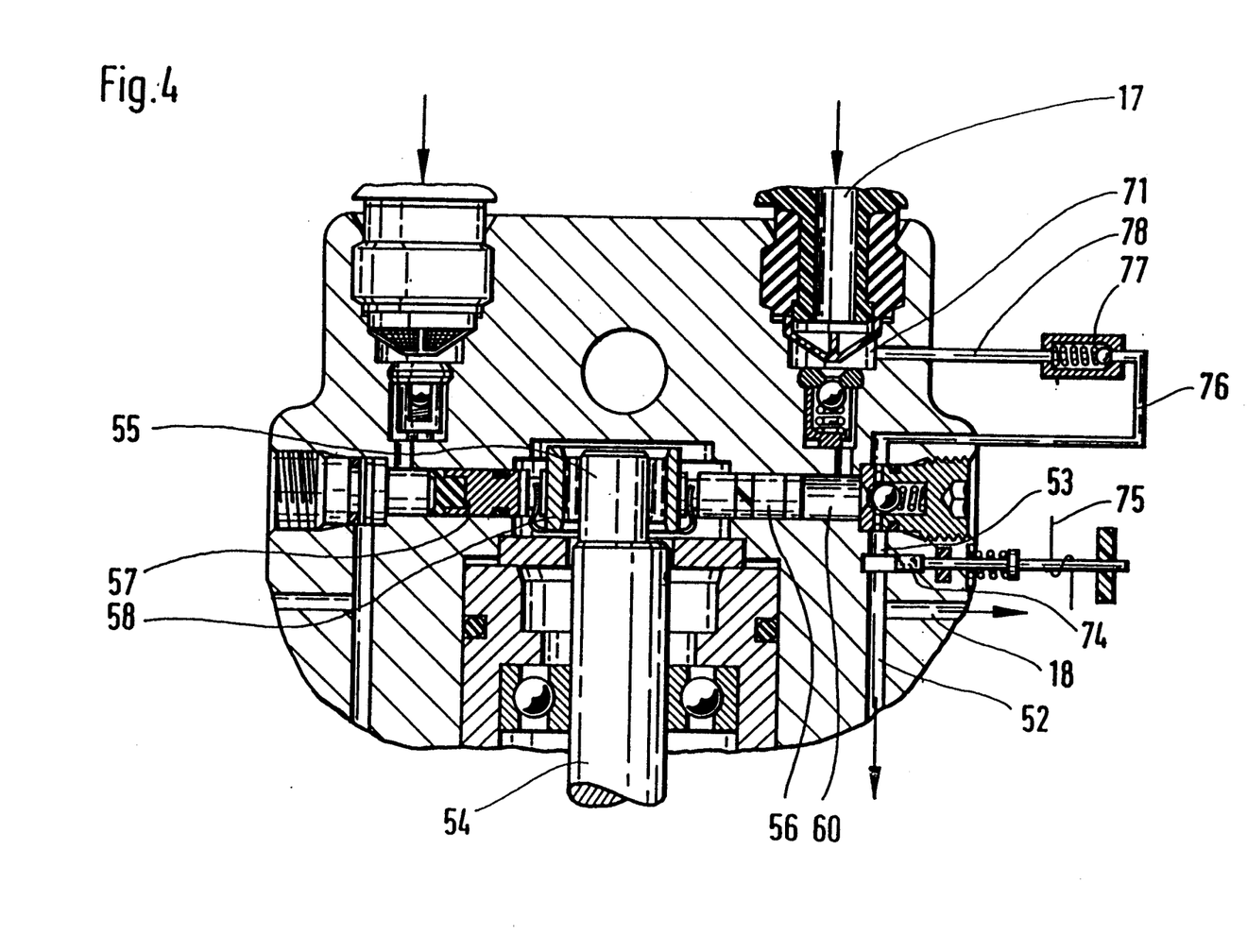

According to the embodiment of FIG. 4, the output of the pump is reduced in that a blocking element 74 shuts off the pressure line 53. When the electromagnetic actuating unit 75 is activated, the blocking element is moved to the left. The blocking element closes the pressure line 53. Pressure fluid will then flow by way of the line 76, the pressure-relief valve 77 and the line 78 to the suction side of the pump. The delivery of pressure fluid into the master cylinder is thus interrupted.

Figure 5:
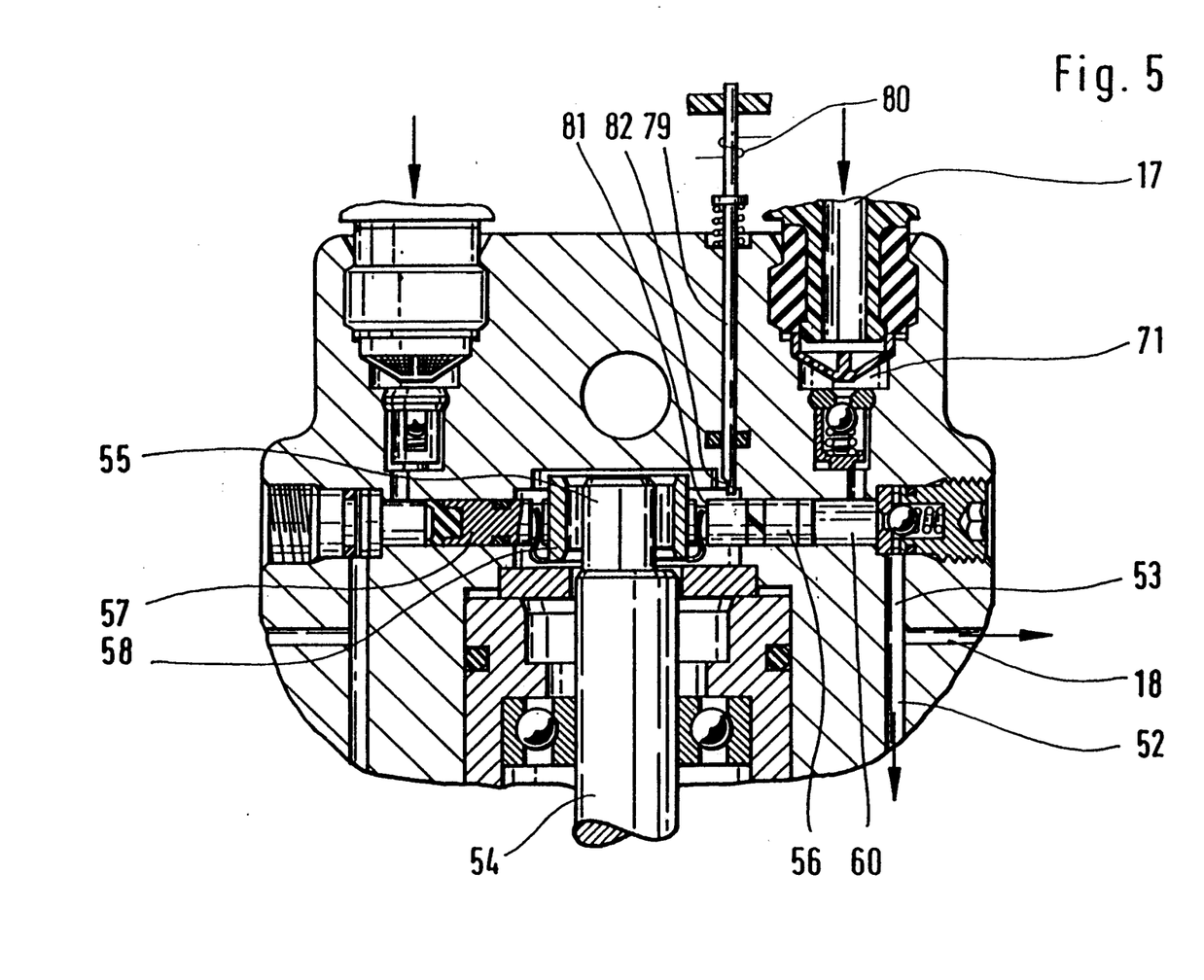

The embodiment according to FIG. 5 provides a slide element 79 which can be moved downwardly by an electromagnetic actuating unit 80. The lifting piston 56 has a step 81 which, in the advanced position of the slide element, is seated on the bottom end 82 of the slide element when the lifting piston is moved from its radially outwardly disposed position in the radially inward direction. The step 81 is retained by the slide element 79 in the top dead center of the lifting piston 56. As a result, the piston 56 no longer follows the cam curve of the eccentric and the sleeve 58, respectively. The delivery of pressure fluid thus is interrupted.

Figure 6:
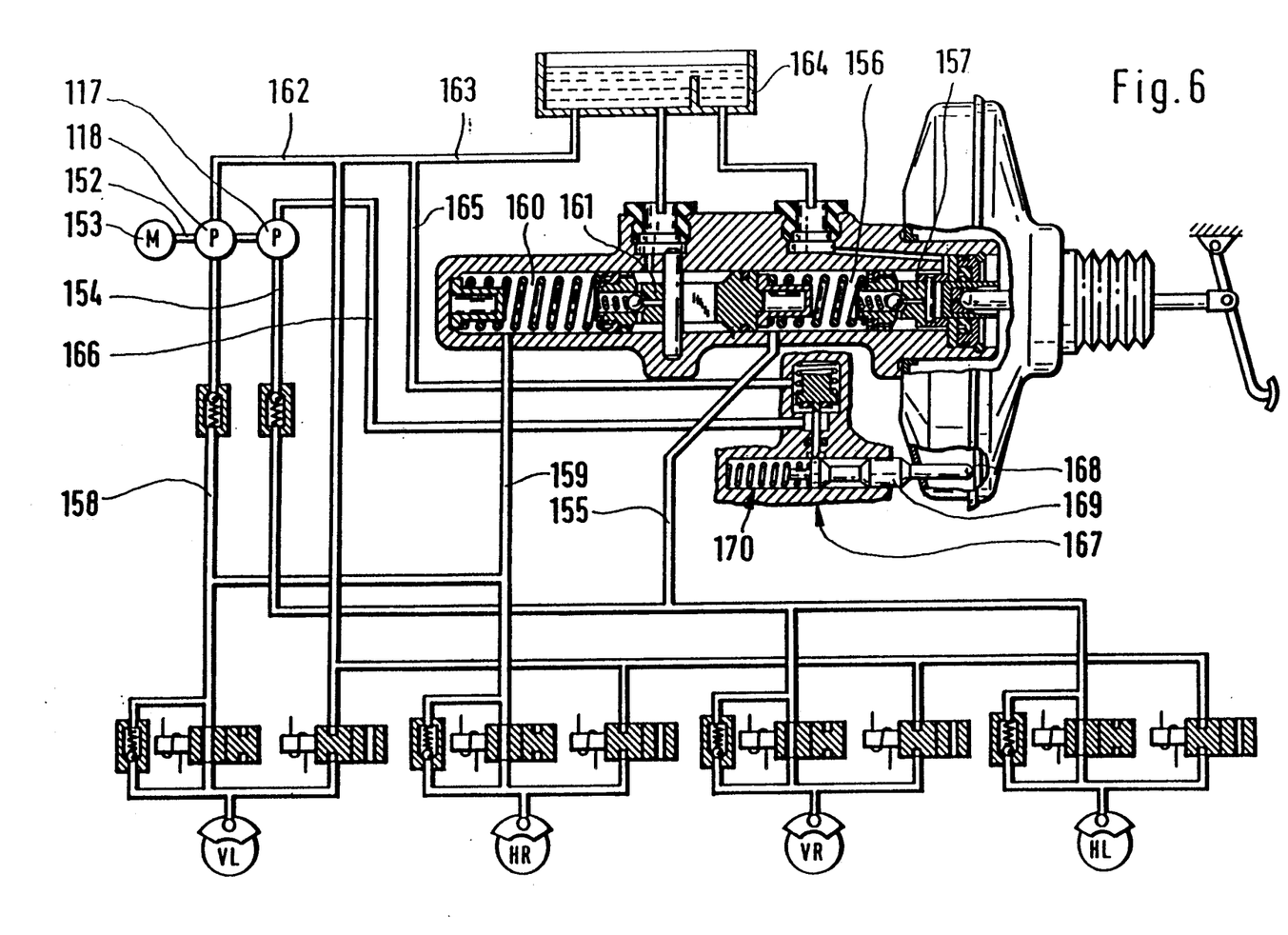
FIG. 6 shows an embodiment of this embodiment of this invention, based on an anti-lock device as it is illustrated in FIG. 1.

FIG. 6 similarly depicts a brake system with a braking pressure regulating device based upon the system according to FIG. 1. For clarity the electronic control unit, the wheel sensors and the electrical lines associated with the wheel sensors have been omitted in FIG. 2. The system according to FIG. 6 functions with two pumps 117, 118 which are driven by the motor 153 by way of a common shaft 152. Pump 117 delivers by way of the lines 154, 155 pressure fluid into the working chamber 156 of the push rod piston 157. On the other hand, pump 117 feeds pressure fluid into the pressure modulator of the braking pressure regulating device, references being made to the description of FIG. 1.

Pump 118 delivers pressure fluid by way of the lines 158, 159 into the working chamber 160 of the floating piston 161. Further, pump 118 delivers pressure fluid into the pressure modulator of the braking pressure regulating device, as has been described with respect to FIG. 1.

Reference numerals 162, 163 are hydraulic lines. These lines establish the pressure fluid supply conduit for the pump 118 on the suction side of the pump. The pressure fluid supply reservoir is designated with reference numeral 164. The hydraulic lines 163, 165, 166 form the pressure fluid supply conduit for the pump 117 on the suction side of the pump. In FIG. 6, a device for blocking the suction side of the pump 117 is provided. In its entirety, this device is assigned reference numeral 167 and is located in the pressure fluid supply conduit on the suction side of the pump. The device for blocking the suction side of the pump is shown in detail in FIG. 7. Referring again to FIG. 6, reference numeral 168 relates to the part of a sheet-metal piston or a diaphragm plate of the vacuum brake power booster. As can be seen from FIG. 6, piston 169 is coupled with this part 168 of the sheet-metal piston or the diaphragm plate, respectively. Upon actuation of the brake power booster, the sheet-metal piston or the diaphragm plate of the vacuum brake power booster moves the piston 169 in an axial direction to the left or to the right. As illustrated in FIG. 6, piston 169 is guided in a cylinder 170. The adjusting force caused by the sheet-metal piston or, respectively, the diaphragm plate of the vacuum brake power booster is illustrated in FIG. 7 by the arrow 171.

Figure 7:
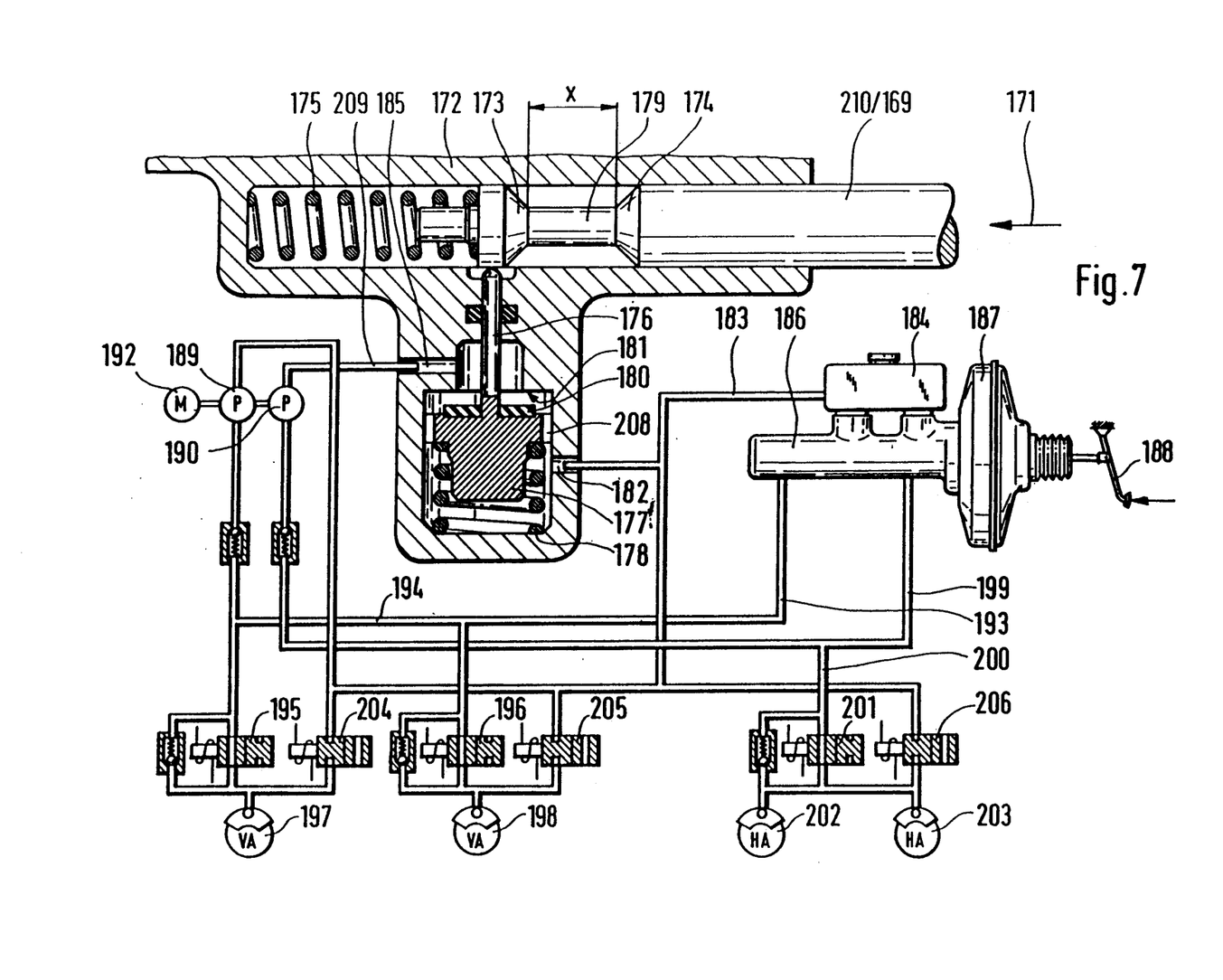
FIG. 7 shows a variant of the embodiment of FIG. 6.

In FIG. 7, the piston 169 is shown on an enlarged scale. It is guided in a cylinder housing 172 which is cast on the master cylinder. Piston 169 comprises two ramps 173, 174. The force 171 which is caused by the vacuum brake power booster and acts upon the piston 169 is opposed by the force of the spring 175.

The tappet 176 arranged radially relative to the piston 169 is displaceable by the piston 177. Piston 177 is exposed to the pressure of the spring 178. The piston is pressed by the spring 178 against the piston 169 and, respectively, against the rams 173, 174 and, respectively, against that part 179 of the piston 169 that is of less diameter, the pressing action being dependent upon the position of piston 169. The piston 177 is provided with a closure member 180 which is arranged as a plate. Allocated to this closure member 180 is the valve seat 181. Reference numeral 182 designates the connecting bore for the line 183 and, respectively, the pressure fluid reservoir 184. 185 is the connecting bore for the suction side of the pump 190.

The hydraulic circuit according to FIG. 7 is arranged differently than the hydraulic circuits according to FIGS. 1 and 6. According to the embodiment of FIG. 7, the brakes for the rear axle, on the one hand, and the brakes for the front axle, on the other hand, are each separately supplied with pressure fluid. This is a so-called "black-and-white". Reference numeral 186 refers to a tandem master cylinder and 187 to the vacuum brake power booster. The brake pedal carries the reference numeral 188. In the embodiment according to FIG. 7, the two pumps 189, 190 are driven by the electric motor 192.

The operation of the brake system according to FIG. 7 is as follows: In the normal braking mode, the brakes 197, 198 of the front axle are supplied with pressure via the lines 193, 194 and the open parallel connected SO-valves 195, 196. The brakes 202, 203 of the rear axle are applied by pressure fluid by way of the lines 199, 200 and the open SO-valves 201. In the anti-lock control mode which has been described in greater detail in respect of FIG. 1, the pump 190 delivers pressure fluid into the pressure chamber of the push rod piston and into the wheel cylinders of the rear-axle brakes. The pump 189 delivers pressure fluid into the pressure chamber of the floating piston and into the wheel cylinders of the front axle in the control mode. As has been described in connection with FIG. 1, the electric motor is put into operation by the electronic control unit in the control mode. The SO-valves 195, 196, 201, and the SG-valves 204, 205, 206 are associated with the pressure modulator, as has been described in connection with FIG. 1. Those valves modulate the pressures in the wheel cylinders corresponding to the control algorithm memorized in the electronic control unit.

In the hydraulic circuit according to FIG. 7, the wheels of the front axle are controlled individually, whereas the wheels of the rear axle have a control in common. In the embodiment according to FIG. 7, the device of blocking the suction side of the pump 190 comprises the closure member 180 and the valve seat 181. Piston, tappet and valve are shown in their inactive position in FIG. 7. The port for the pump suction side is open. This means there is a hydraulic connection between the reservoir 184 and the suction side of the pump 190 by way of the line 183, the bore 182, the channels 208 in the piston 177, the opened valve 180, 181, the bore 185, and the line 209.

It shall now be assumed that the brake pedal is applied and a control action commences. The force 171 is exerted on the piston 169. The piston displaces to the left. The ramp 173 releases the top end of the tappet 176. The spring 178 presses the closure member 180 on the valve seat 181. The suction side of the pump 190 is closed. The pump no longer delivers. The working chamber 156 on the push rod piston side, see FIG. 6, becomes exhausted, which essentially means pressure fluid no longer is supplied into this chamber.

Since there is a connection between push rod piston and brake pedal, the brake pedal now can be moved without appreciable effort to cover a defined distance. This distance is dictated by the distance X, as illustrated in FIG. 7. After having overcome the distance X, the second ramp 174 becomes effective. The second ramp overrides the top end of the tappet 176 and presses it downwardly. As a result, the closure member 180 lifts from the valve seat 181. The suction side of the pump is re-opened. Pressure fluid is delivered into the pressure chamber pertaining to the push rod piston.

Figure 8:
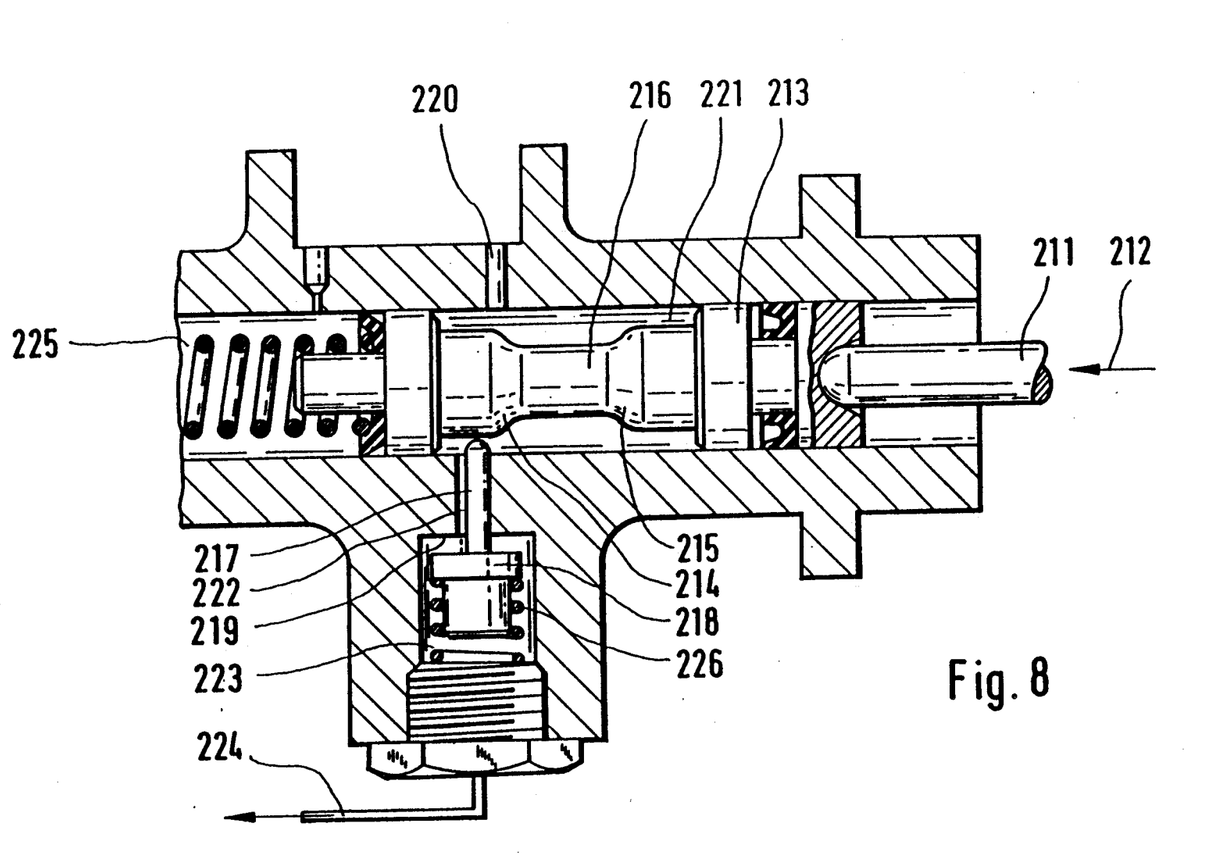
FIG. 8 shows a further embodiment in accordance with the present invention.

FIG. 8 shows another embodiment. FIG. 8 shows part of a master cylinder in a cross-sectional view. Reference numeral 211 designates the push rod of a brake power booster which, upon operation of the booster in the direction of the arrow 212, moves the working piston 213 to the left. This working piston comprises two ramps 214, 215 and a small-diameter part 216. The ramps move the tappet 217 which is coupled to the valve member 218. Reference numeral 219 represents the associated valve seat. When the working piston 213 moves to the left in FIG. 8, and namely away from the initial position shown in FIG. 8, the ramp 214 releases the tappet 217. Caused by the pressure of the spring 216, the valve member 218 is seated on the valve seat 219. This interrupts the pressure fluid supply conduit to the pump. This pressure fluid supply conduit is formed of the channel 220, which is in communication with the pressure fluid reservoir, of the annular chamber 221, the channel 222, the chamber 223 and the connecting line 214 to the suction side of the pump. The pump does not deliver fluid into the pressure chamber 225. The pressure chamber 225 ahead of the working piston 113 is then exhausted. When in the anti-lock control mode pressure fluid is discharged out of the system into the pressure fluid reservoir by way of the pressure modulator, see FIG. 1, the pressure fluid volume in chamber 225 decreases, as is illustrated hereinabove. As a result, piston 213 moves further to the left. Subsequently, ramp 215 comes into effect. Ramp 215 lifts, through the tappet 217, the valve member 218 from the valve seat 219 so that free flow of pressure fluid is possible again from the reservoir to the suction side of the pump. Pressure develops again in chamber 225. The working piston 213 is moved to the right. The valve composed of valve member 218 and valve seat 219 starts a breathering action. A control action takes place in the area of the ramp 215. The piston 213 and the brake pedal coupled thereto thereby are in their advanced position.

The embodiment last described can be designed both in connection with the push rod piston and with the floating piston or by means of both pistons. The embodiment according to FIG. 7 facilitates economy of the lines and control elements.

What is claimed is:

1. A brake system for automotive vehicles, comprising a master cylinder, wheel cylinders and a device for anti-lock control, wherein in the control mode for the positioning of at least one piston of the master cylinder in a desired position, there is provided a pump, whose volume of delivery is variable, which is connected by way of a hydraulic pressure line with the master cylinder and which positions the piston by the volume of fluid it delivers, which is part of a pump unit having at least one inlet line providing connection to the supply reservoir, with an electronic control unit for the anti-lock control, wherein the pump unit includes means which reduce the pump output as a function of the position of the master cylinder working piston and wherein the reduction of delivery volume is provided by a non-return valve which is kept open whereby movement of the piston (56) is ineffective with respect to the delivery of pressure fluid.

2. A brake system as claim in claim 1, wherein said means are adapted to be activated by one or more output signals of the electronic control unit.

3. A brake system as claim in claim 2, wherein said means are activated electromagnetically.

4. A brake system as claimed in claim 2, wherein said means are activated hydraulically.

5. A brake system as claimed in claim 2, wherein said means are activated mechanically.

6. A brake system as claimed in claim 2, wherein said means are activated pneumatically by vacuum.

7. A brake system for automotive vehicles, comprising a master cylinder, wheel cylinders and a device for anti-lock control, wherein in the control mode for the positioning of at least one piston of the master cylinder in a desired position, there is provided a pump, whose volume of delivery is variable, which is connected by way of a hydraulic pressure line with the master cylinder and which positions the piston by the volume of fluid it delivers, which is part of a pump unit having at least one inlet line providing a connection to the supply reservoir, with an electronic control unit for the anti-lock control, wherein the pump unit includes means which reduce the pump output as a function of the position of the master cylinder working piston, and having a suction or inlet valve in the inlet line of the pump unit which is arranged as a non-return valve, wherein there is provided a tappet device (63) which lifts the closure member (64) of the non-return valve from the valve seat (65).

8. A brake system as claimed in claim 1, having a non-return valve in the inlet line of the pump unit, wherein there is provided a tappet device (67) which jams the closure member (64) of the suction or inlet valve, which is provided as a non-return valve, in its opened position and thereby permits passage of the pressure fluid.

9. A brake system as claimed in claim 1, wherein the inlet line (17) contains a shut-off mechanism, consisting of a closure member (69) and a valve seat (70).

10. A brake system for automotive vehicles, comprising a master cylinder, wheel cylinders and a device for anti-lock control, wherein in the control mode for the positioning of at least one piston of the master cylinder in a desired position, there is provided a pump, whose volume of delivery is variable, which is connected by way of a hydraulic pressure line with the master cylinder and which positions the piston by the volume of fluid it delivers, which is part of a pump unit having at least one inlet line providing a connection to the supply reservoir, with an electronic control unit for the anti-lock control, wherein the pump unit includes means which reduce the pump output as a function of the position of the master cylinder working piston, and wherein the pressure line is provided with a shut-off mechanism comprising a displaceable blocking element (74) which shuts off the pressure line (53) to the master cylinder so that, upstream of the shut-off mechanism, the pressure line connects by way of a hydraulic return line (76, 78) with the inlet line, and in that a pressure-relief valve (77) is arranged in the return line.

11. A brake system for automotive vehicles, comprising a master cylinder, wheel cylinders and a device for anti-lock control, wherein in the control mode for the positioning of at least one piston of the master cylinder in a desired position, there is provided a pump, whose volume of delivery is variable, which is connected by way of a hydraulic pressure line with the master cylinder and which positions the piston by the volume of fluid it delivers, which is part of a pump unit having at least one inlet line providing a connection to the supply reservoir, with an electronic control unit for the anti-lock control, wherein the pump unit includes means which reduce the pump output as a function of the position of the master cylinder working piston, and comprising a pump with a lifting piston, wherein there is provided a stroke-limiting device which consists of a slide element (79) blocking the movements of the lifting piston.

12. A brake system as claimed in claim 11, wherein the lifting piston (56) abuts on the slide element by a step (81), when the slide element (79) is actuated.

13. A brake system for automotive vehicles, comprising a master cylinder, wheel cylinders and a device for anti-lock control, wherein in the control mode for the positioning of at least one piston of the master cylinder in a desired position, there is provided a pump, whose volume of delivery is variable, which is connected by way of a hydraulic pressure line with the master cylinder and which positions the piston by the volume of fluid it delivers, which is part of a pump unit having at least one inlet line providing a connection to the supply reservoir, with an electronic control unit for the anti-lock control, wherein the pump unit includes means which reduce the pump output as a function of the position of the master cylinder working piston, and wherein there is provided a device for blocking the suction side of the pump, wherein this device is arranged as to remove blocking of the suction side when the working piston of the master cylinder has covered a predetermined distance into the master cylinder.

14. A brake system as claimed in claim 13, wherein the device for blocking the suction side of the pump consists of a valve which is actuatable by way of a ramp-and-tappet arrangement.

15. A brake system as claimed in claim 14, wherein the device for blocking the suction side of the pump (190) comprises a piston element (210) provided with ramps (173, 174), a tappet element (176), a valve seat (181), a closure member (180) subjected to the pressure of a spring (178), wherein, upon movement of the piston element (169), the ramps (173, 174) of the piston element (169) move the tappet element (176), and wherein the tappet element (176) lifts the closure member (180) from the valve seat (181).

16. A brake system as claimed in claim 15, wherein the device for blocking the suction side of the pump is provided as an integral part of the master cylinder.

17. A brake system as claimed in claim 16, wherein the device for blocking the suction side of the pump is accommodated in a housing that is mounted on the master cylinder cast thereon.

18. A brake system as claimed in claim 17 wherein the device for blocking the suction side of the pump comprises at least one working piston (213) (push rod piston and/or floating piston) of the master cylinder, which working piston is provided with switching ramps (214, 215), a tappet element (217), a valve seat (219), a closure member (218), wherein upon movement of the working piston (213) the ramps (214, 215) of the working piston (213) will move the tappet element (217), and wherein the tappet element (217) lifts the closure member (218) from the valve seat (219).

* * * * *